United States Patent [19]

Yamashita et al.

[11] 3,979,158

[45] Sept. 7, 1976

[54] PERISCOPE-TYPE REAR VIEW MIRROR APPARATUS FOR AUTOMOBILE

[75] Inventors: Makoto Yamashita, Kanagawa; Masagoro Kushida, Isehara; Fumio Niitsuma, Hatano; Masao Enomoto, Yokohama; Akira Miyamoto, Tokyo, all of Japan

[73] Assignee: Ichikoh Industries Limited, Tokyo, Japan

[22] Filed: June 23, 1975

[21] Appl. No.: 589,771

Related U.S. Application Data

[63] Continuation of Ser. No. 426,691, Dec. 20, 1973, abandoned.

[52] U.S. Cl............................. 350/302; 350/301; 350/307
[51] Int. Cl.²......................................... G02B 5/08
[58] Field of Search ........... 350/288, 301, 302, 307, 350/277, 283

[56] References Cited

UNITED STATES PATENTS

| | | | |
|---|---|---|---|
| 1,971,333 | 8/1934 | Allam | 350/283 X |
| 3,058,395 | 10/1962 | Mattsson | 350/302 |
| 3,463,578 | 8/1969 | Smith | 350/302 |
| 3,704,062 | 11/1972 | Toy | 350/302 X |
| 3,773,406 | 11/1973 | Baumgardner | 350/302 |
| 3,774,996 | 11/1973 | Donnelly | 350/302 |
| 3,857,632 | 12/1974 | Yamashita et al. | 350/302 |

FOREIGN PATENTS OR APPLICATIONS

2,051,897  4/1972  Germany ............................ 350/302

Primary Examiner—John K. Corbin
Assistant Examiner—F. L. Evans
Attorney, Agent, or Firm—Wenderoth, Lind & Ponack

[57] ABSTRACT

A periscope-type rear view mirror for automobiles which has a planar objective mirror positioned above an aperture formed through the roof of the driver's compartment of the automobile body for reflecting the light rays coming from behind the automobile forwardly and downwardly into the driver's compartment. A planar reflecting mirror is positioned substantially parallel to the objective mirror in the driver's compartment for reflecting the light rays reflected from said objective mirror forwardly and upwardly to a planar eye-piece mirror positioned close to said reflecting mirror and having a mirror surface crossing obliquely at an acute angle for reflecting the light rays reflected from said reflecting mirror into the driver's eye position. Said reflecting mirror is fixed to a stay, and said eye-piece mirror is pivotally secured to said stay which, in turn, is pivotally secured to the inner wall of the automobile at a position close to said aperture.

2 Claims, 7 Drawing Figures

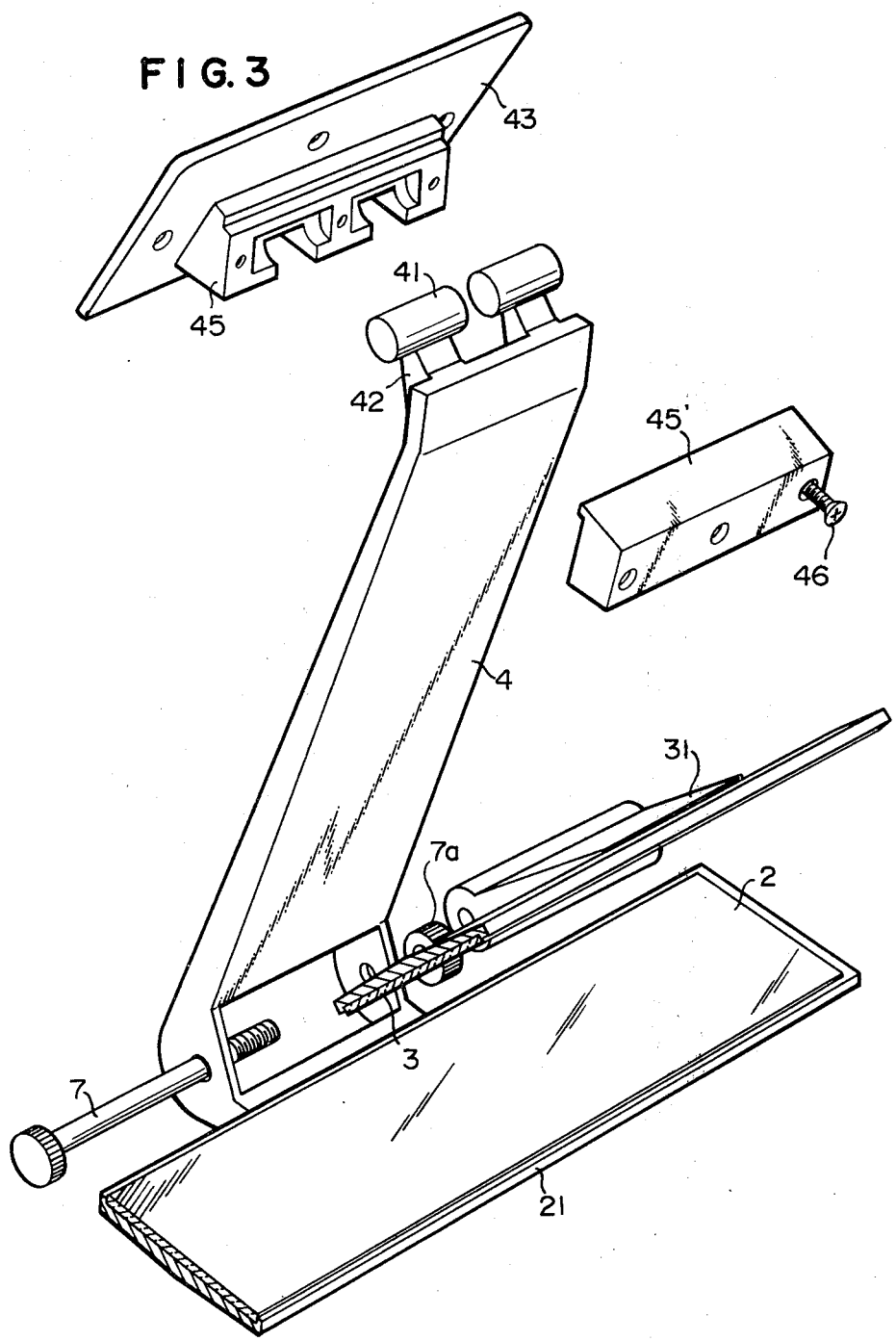

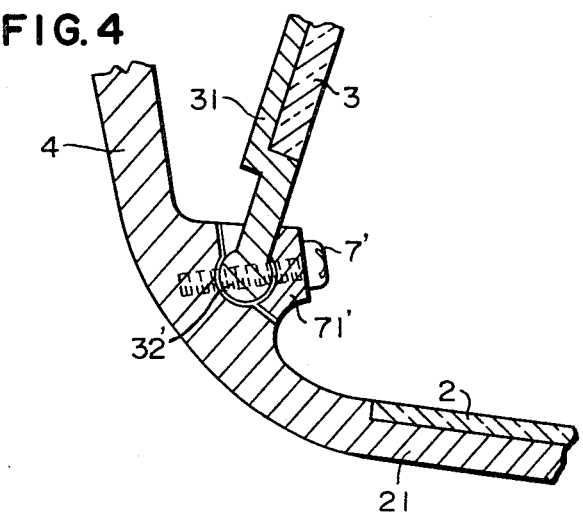
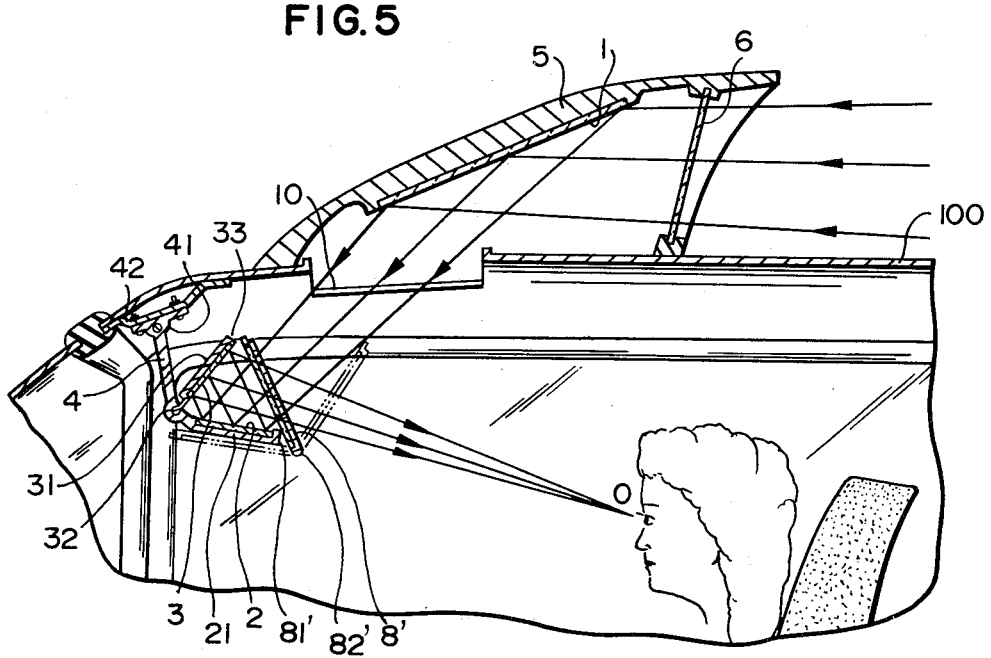

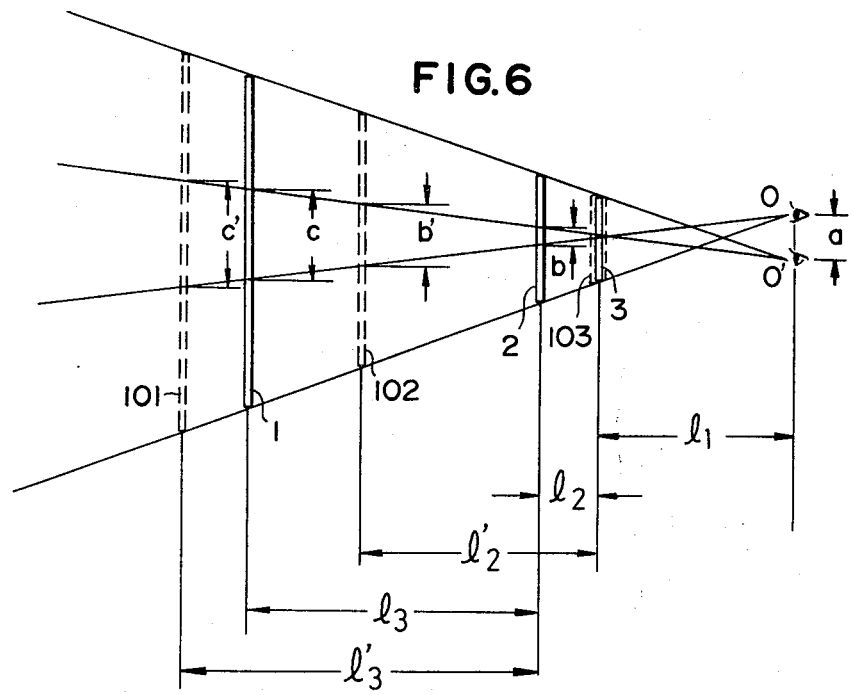
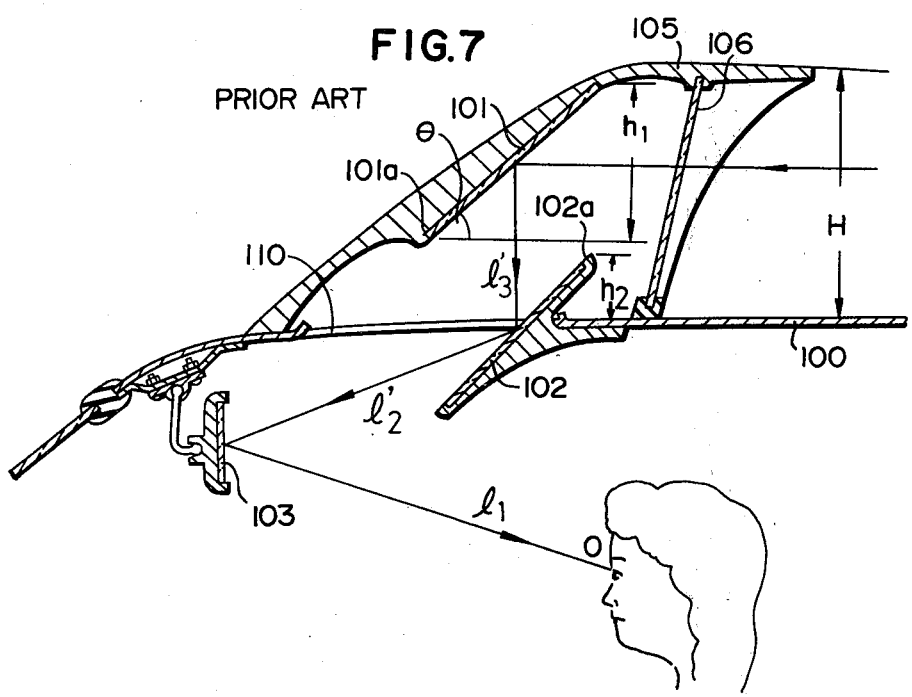

PERISCOPE-TYPE REAR VIEW MIRROR APPARATUS FOR AUTOMOBILE

This is a continuation application of application Ser. No. 426,691, filed Dec. 20, 1973, now abandoned.

BACKGROUND OF THE INVENTION a. Field of the invention.

The present invention pertains to a rear view mirror apparatus for automobiles. More specifically, the present invention relates to a rear view mirror apparatus of periscope type for automobiles utilizing three planar mirrors and arranged to obtain rear views.

b. Description of the prior art

The typical structure of known rear view apparatuses is as shown in FIG. 7. More specifically, such a structure features an arrangement having a reflecting mirror 102 for reflecting the light rays reflected from an objective mirror 101. Said reflecting mirror is mounted on the rearward edge of an opening 110 formed through the top or roof 100 of the driver's chamber of an automobile and relects said light rays forwardly and downwardly therefrom. The latter reflected light rays are again reflected to an eye-piece mirror 103 having a structure similar to that of an ordinary room mirror and directed toward the eyes of the driver. Such a known rear view mirror of periscope type, however, has the following problems.

1. The housing 105 for containing the objective mirror 101 must be of a substantial height H and protrude from the top of the driver's chamber. This is not only undesirable from the viewpoint of design, but also will cause increased resistance to the automobile itself during running, for the following reasons.

The objective mirror 101 must be positioned so that its lowermost end 101a will be located above of the uppermost end 102a of the reflecting mirror 102 so that the objective mirror 101 may catch the light rays coming from the rear. Accordingly, the distance H which the housing protrudes from the roof 100 of the automobile will be: $H \geq h_1 + h_2$ (wherein: $h_1$ represents the height of the objective mirror 101; $h_2$ represents the distance with which the reflecting mirror 102 projects above the top 100 of the automobile). It should be noted, however, that into the reflecting mirror 102 protrudes to an excessive extent in the driver's chamber, the latter space will become smaller accordingly, thereby causing aggravation to the driving conditions as well as obstructing the forward view, and, furthermore, will be hazardous to the driver should he hit his forehead against the protruding reflecting mirror. Therefore, the reflecting mirror must to be positioned as high as possible in the driver's chamber. This, in turn, will cause the distance $h_2$ to increase as a matter of course. On the other hand, since the position of the reflecting mirror 102 is predetermined as stated above, it is not possible to have the angle of inclination $\theta$ of the objective mirror 101 smaller than a certain value. Accordingly, the magnitude of $h_1$ also cannot be made smaller than a certain level. As a result, the value of H will be substantially great as a matter of course.

2. As shown in FIGS. 6 and 7, the movement on $b'$ and $c'$ of the range of field of vision on the faces of the reflecting mirror 102 and the objective mirror 101 relative to the amount of movement of the eye, will be great. Accordingly, there must be provided a larger objective mirror 101 and reflecting mirror 102 to encompass the total range of the field of vision. Thus, the apparatus itself will have an undesirably large size. This is quite disadvantageous from the viewpoints of the operational efficiency of mounting the apparatus onto the vehicle, the design and the cost.

Such disadvantages are caused by the fact that the optical distance (the length of the path of the light rays) between the respective mirror surfaces is excessively great when compared with the length of the path of light rays from the eye to the eye-piece mirror 103. Let us now assume that the length of the path of light rays from the eye to the eye-piece mirror 103 is designated as $l_1$, that the length of the path of light rays from the eyepiece mirror 103 to the reflecting mirror 102 is designated as $l'_2$, and that the length of the path of light rays from the reflecting mirror 102 to the objective mirror 101 is designated as $l'_3$. Now, the foregoing disadvantages can be explained by using the aforesaid designations. There can be set forth the following relationship between the amount of movement of the eye and the movement $b'$ and $c'$ of the range of the field of vision at the respective mirror surfaces of the reflecting mirror 102 and the objective mirror 101:

$$\frac{a}{l_1} \infty \frac{b'}{l'_2} \propto \frac{c'}{l'_2 + l'_3}$$

3. Also, since the reflecting mirror 102 is large as stated above, it is difficult to clean the surfaces of the objective mirror 101 and the window 106.

In order to eliminate the aforesaid drawbacks and inconveniences, there is proposed a rear view apparatus of periscope type designed to have a compact size by the combined use of a convex lens and a concave mirror. However, such an optical system will develop changes in the magnification of the image, a distorted image or disappearance of the image as the position of the eye is altered.

Furthermore, the convex lens and a concave mirror apparatus requires processing with a very high degree of precision in order to avoid the distortion of the image reflected thereby, and also requires a very strict postioning of components and a precision arrangment. Thus, this known apparatus will undesirably be accompanied by a high cost of parts along with a decrease in productivity. As such, such an apparatus will require a cost which may be several times or several tens of times more than that of the apparatus utilizing planar mirrors.

SUMMARY OF THE INVENTION

It is, therefore, an object of the present invention to provide a rear view mirror apparatus of periscope type for automobiles having a new optical system, which does not use convex lenses nor concave mirrors and which, in particular, uses compact-sized reflecting mirrors and which, accordingly, contributes to giving more space to the driver's compartment and does not remain in the way when the objective mirror and the other parts are cleaned, and in which the height of the protrusion above the top of the driver's compartment can be markedly reduced.

Another object of the present invention is to provide a rear view mirror apparatus of periscope type as described above, which permits adjustment of the angle of both the eye-piece mirror and the reflecting mirror and which provides safety at the time of an accident.

Still another object of the present invention is to provide a rear view mirror apparatus of periscope type described above, which is arranged so that the amount of light rays incident to the eyes of the driver can be switched over in three steps.

BRIEF DESCRIPTION OF THE DRAWINGS

FIG. 3 is a perspective view of that portion of the rear view apparatus of the present invention shown in FIG. 2 which is located on the inside of the automobile body, in which a part of the component members is shown in an exploded fashion.

FIG. 4 is a vertical sectional view of that portion of the rear view mirror apparatus of the present invention which is located on the inside of the automobile body, representing a modification of the similar portion of FIG. 2.

FIG. 5 is a vertical sectional view taken along the center line, showing a second example of the apparatus of the present invention.

FIG. 6 is an explanatory illustration, showing the relationship of the optical system employed in the apparatus of the present invention, and also showing the relationship between the optical system employed in this invention and that of the conventional such apparatus of periscope type.

FIG. 7 is an explanatory illustration, showing in a vertical section the structure of the prior art rear view mirror apparatus of periscope type.

DETAILED DESCRIPTION OF THE PREFERRED EMBODIMENT

Figure 1:
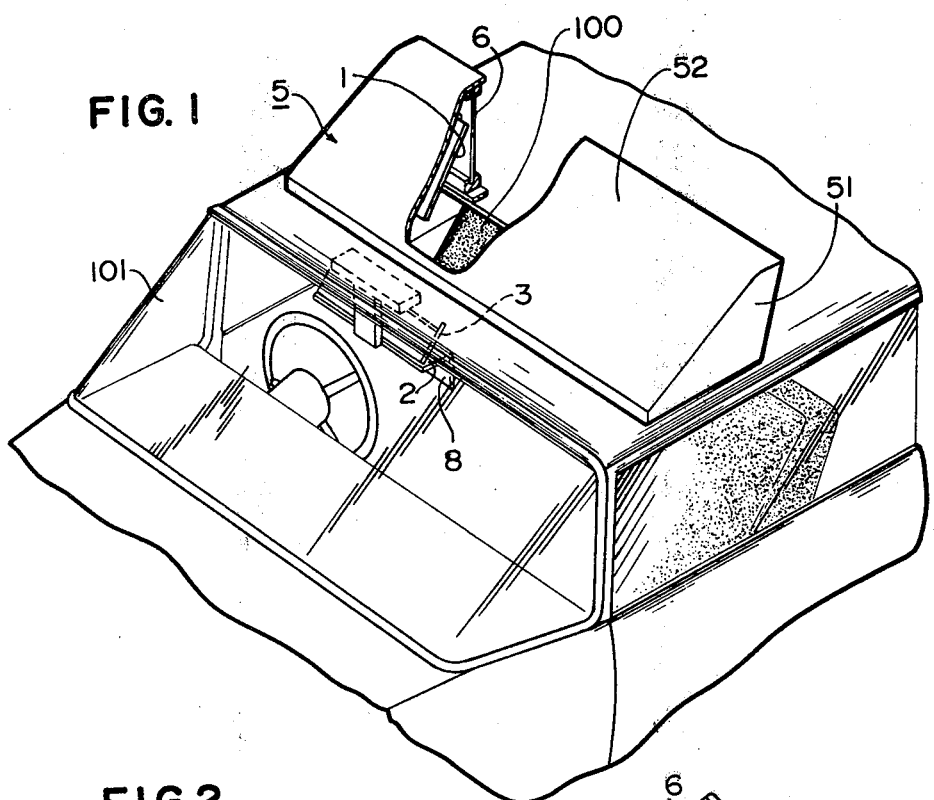
FIG. 1 is a perspective view of a part of an automobile equipped with a rear view mirror apparatus of periscope type according to the present invention, in which a part of the rear view mirror apparatus is broken away.

Description will hereunder be made on an example of the rear view mirror apparatus of the present invention.

The terms hereinafter used in this specification to express the directions, i.e., forward, rearward, upper and lower, are to be understood to correspond to the directions used with respect to an automobile. The apparatus has 3 planar mirrors, i.e., an objective mirror 1, a reflecting mirror 2 and an eye-piece mirror 3. The objective mirror 1 is positioned within a housing 5, which, in turn, is fixed onto the roof 100 of an automobile. Also, the reflecting mirror 2 and the eye-piece mirror 3 are arranged in a V-shape in the driver's chamber at a position above the front windshield 101.

Said housing 5 has two side-walls 51 which are positioned close to the bilateral sides of the roof 100 of the driver's chamber, and also has a front wall 52 connecting the upper end edges of said two walls 51 and inclined at an angle substantially equal to the angle of inclination of the windshield. The housing 5 further has a lower-positioned opening and a rearward opening which are formed through the roof 100 and at the rear-end of the housing 5, respectively. A glass pane 6 is fitted in that opening located at the rear-end of the housing 5 to prevent the entry of dust and drops of rain into the inner space 53 of the housing 5 from the outside thereof. A frame of the glass pane 6 is provided so as to bridge between said front wall, the inner surfaces of the side-walls and the lower end of the inner surfaces of these side-walls. Housing 5 is fixed to the roof 100 of the automobile by bolts and arranged so that its front wall 52 is positioned on the front windshield's side and so that its lower-positioned opening is positioned on the roof 100 of the automobile in such a way that this opening is located just on top of an aperture 10 which has been provided in the roof of the automobile body at the time of the manufacture of this body via gasket 54 provided on the roof of the automobile so as to be interposed between the front wall, the sidewalls, the lower field of said frame and the roof.

The objective mirror is fixed, with an angle of inclination $\theta$ relative to a horizontal plane, to the inner surface of said front wall of the housing.

With the aforesaid arrangment, the light rays coming from the objects located rearwardly of the automobile pass through the glass pane 6 and reach the objective mirror 1. This objective mirror 1 is arranged so that its reflecting surface is of a sufficiently small inclination angle $\theta$ relative to a horizontal plane in order to assure that the aforesaid light rays are reflected at the reflecting surface of the objective mirror 1 forwardly and downwardly into the space of the driver's compartment.

The reflecting mirror 2 is provided substantially horizontally so that the reflected light rays from the objective mirror 1 are reflected from the surface of this reflecting mirror 2 upwardly and forwardly. The eye-piece mirror 3, on the other hand, is disposed to form a substantially V-shape with the reflecting mirror 2 at a position close to the reflecting mirror 2 and in such a way that its reflecting surface opposes the reflecting surface of the reflecting mirror 2. This reflecting mirror 2 is fixed to a mirror support frame 21; and a stay 4, extending upwardly from this mirror support frame 21, is hinged at its upper end to the inner side of the front upper wall of the driver's compartment so as to be pivotable back and forth with a certain holding torque to be held stationary at a desired pivot angle.

FIG. 3 shows such a hinge in detail. The stay 4 has, close to its upper end, a fulcrum member 41 which is supported by an arm 42. A housing is provided in the stay's base 43 which is fixed to the inner wall of the body of the automobile. Said fulcrum member 41 of the stay 4 is held by said housing. This housing is comprised of a member 45 which is provided integrally with the base 43 and another member 45' which can be fixed to said member 45. Each of these members 45, 45' is provided with a groove for jointly receiving the fulcrum member 41, these two grooves being of shapes which jointly form a fulcrum member-receiving bore. Said member 45' of the housing is fixed to said member 45 by means of threaded screws 46 which are screwed into member 45 at positions close to the opposite ends of said member 45'. The holding power of the housing 44 is adjustable by the degree of tightening of these screws 46. On the other hand, an opening 71 is formed in the stay 4 at a site close to the support frame 31 of the mirror 3. Side-walls 72 and 72 of the stay 4 which cooperatively define the aforesaid opening 71 are each made to have a small thickness so that these walls 72 and 72 may have flexibility. Into this opening 71 is fitted a pivotable extension 32 of the support frame 31 of the mirror 3. Said extension 32 is clamped tightly at opposite sides thereof by a threaded bolt 7 which passes through the side-walls 72, 72 and also through the extension 32, with the help of a nut 7a, to thereby have the support frame 31 of the mirror 3 firmly within the stay 4. The magnitude of the torque with which the support frame 31 is held by the stay 4 can be adjusted by the degree of tightening the bolt 7. By providing a lug at the upper edge of the support frame 31, there is obtained the convenience, when it is intended to alter the angle of the eye-piece mirror 3, that this can be done easily by pivoting the support frame 31 manually.

It should be understood that the structure of the region in which the support frame 31 is attached to the site close to the boundary between the stay 4 and the support frame 21 is not limited to the arrangement stated above, but any other arrangement may be adopted so long as the support frame 31 may be pivotably secured while insuring an appropriate holding torque.

FIG. 4 shows another embodiment of means of holding the support frame 31 of the eye-piece mirror 3 relative to the stay 4. That portion of the stay 4 located close to the support frame 21 of the reflecting mirror 2 has a semi-circular bearing groove member into which is to be fitted the shaft 32 of the support frame 31. A pressing member 71' having a semi-circular bearing groove member, which forms, jointly with the aforesaid semi-circular bearing groove member of the stay 4, a round bearing bore is fixed to the stay 4. Said shaft 32 is held in this bearing hole which is thus formed. The pressing member 71' is fixed to the stay by a bolt 7'. By altering the degree of tightening of this bolt 7', it is possible to adjust the torque with which the support frame 31 is held.

As stated above, the angle of the reflecting mirror 2 can be altered as desired by pivoting the stay 4, and also the eye-piece mirror 3 can be altered in its angle relative to the reflecting mirror 2. Accordingly, in case the position of the eyes of the driver is different between a certain person and another person due to the difference in height of such persons, the angle of the eye-piece mirror 3 may be altered to adjust the optical sequency when the difference in the positions of the eyes between a certain person and another person is relatively small. However, in case this difference is substantial, the stay 4 may be pivoted so that the angle of the reflecting mirror 2 is altered accordingly, and thus the positional relationship in the optical system may be adjusted. In case of an accident, such as a collision of the automobile, the stay is easily pivoted away from the driver's head and thus safety is assured. Moreover, the eye-piece mirror 3 and the reflecting mirror 2 can be easily cleaned.

The optical system described above which is employed in the rear view mirror apparatus of the present invention is arranged, as will be understood clearly from FIG. 6, so that the reflecting mirror 2 is positioned close to the eye-piece mirror 3, and that the length $l_2$ of the path of light rays between the reflecting mirror 2 and the eye-piece mirror 3 is very small as compared with that of the optical system of conventional rear view mirror apparatus of periscope type, and further that the length $l_2 + l_3$ of the path of light rays from the eyepiece mirror 3 to the objective mirror is also small. As a result, the amounts of movement $b$ and $c$ of the range of field of vision at the respective mirror faces of the reflecting mirror 2 and the objective mirror 3, relative to the amount of movement $a$ of the positions of the driver's eyes becomes much smaller than those in the conventional such apparatuses. Because of the very small length $l_2$ of the path of light rays between the eye-piece mirror 3 and the reflecting mirror 2 in particular, the reflecting mirror 2 can have a greatly reduced size almost up to the size of the eye-piece mirror 3.

Furthermore, since the apparatus of the present invention does not require the provision of a large reflecting mirror 2 at the edge portion of the aperture 10 of the roof 100 as is required in the conventional apparatuses, there does not occur any aggravation in the driving condition, and in addition, the objective mirror 1 can be provided at a considerably lower position. Moreover, it is possible to make the objective mirror 1 to have a considerably smaller size. What is more, since the angle $\theta$ of the objective mirror 1 relative to the horizontal plane is considerably smaller than that of the conventional apparatuses, it is possible to make the height H by which the housing 5 for containing the objective mirror 1 protrudes from the roof 100 of the automobile body markedly smaller as compared with such height in conventional apparatuses. Accordingly, the apparatus of the present invention is greatly advantageous from the viewpoint of styling of automobiles, and also from the fact that the resistance of the automobile body during its running can be minimized.

In the rear view mirror apparatus according to the present invention, there is provided a filter at a desired position in the path of light rays to thereby provide the effect of preventing the driver from being dazzled by the light rays. More specifically, a stay 81 having a pivot-receiving portion which is parallel with the upper edge of the support frame 31 of the eye-piece mirror 3 is hinged, with a certain holding torque as in the case of the aforesaid stay 4, to the inner wall surface of the driver's compartment to extend from this wall surface to a position near said upper edge of the support frame 31. In this pivot-receiving portion is fitted a cylindrical pivot 82 which, in turn, is provided on one side edge of a filter 8 so as to be supported therein for pivotal movement about the shaft of this pivot 82. In this arrangement, there is given a certain friction between the pivot-receiving portion and the shaft of said pivot 82 in order that the filter 8 may be held at a desired angle relative to the horizontal plane. The filter 8 is given a size slightly greater than the size of the reflecting mirror 2. This filter is arranged so that, when it is pivoted downwardly, the tip of the filter 8 is anchored to the rearward end of the support frame 21 of the reflecting mirror 2. The filter 8 is arranged also that, when it is pivoted upwardly, this filter 8 is positioned outside of that beam of light rays reflected from the objective mirror 1 and impinging onto the reflecting mirror 2 prior to being anchored either to the roof 100 of the driver's compartment or to the forward edge of the aperture 10 formed in said roof.

Figure 2:
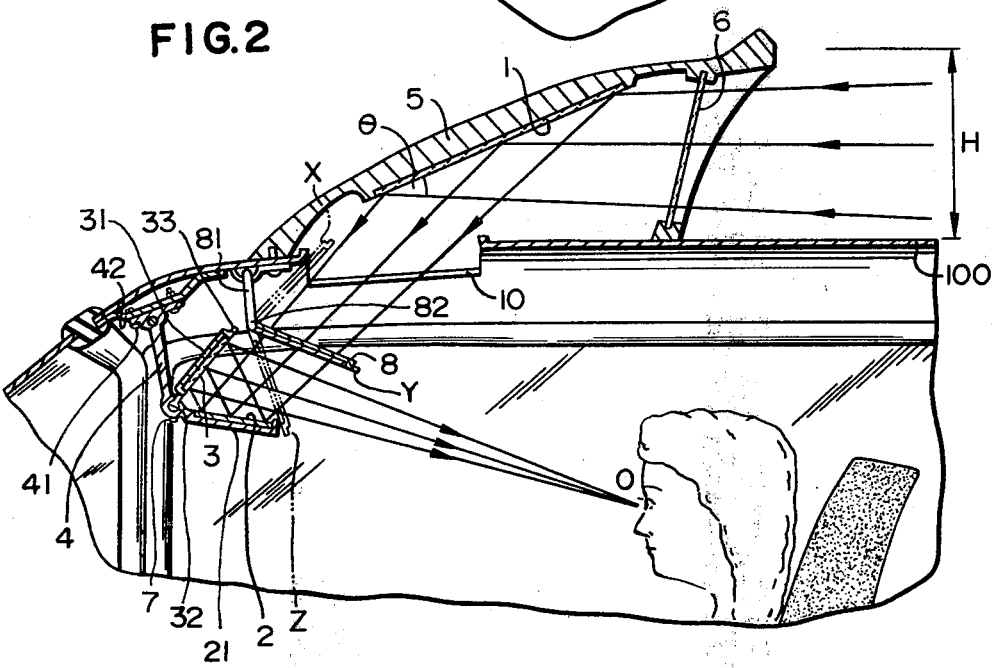
FIG. 2 is a vertical sectional view taken along the center line of the apparatus shown in FIG. 1 representing a first example.

Because of this arrangement, the filter 8 may be held at a position (the position indicated by X in FIG. 2) which is outside the aforesaid beam of light rays, to thereby obtain maximum amount of those light rays incident to the eyes of the driver. Alternatively, the filter 8 may be pivoted downwardly to a certain degree to be held at a position Y which is substantially parallel with the beam of light rays reflected from the eye-piece mirror 3 onto the eyes O. By doing so, the light rays reflected from the objective mirror 1 are passed once through this filter 8, to thereby reduce the amount of those light rays incident to the eyes. Or, the filter 8 may be pivoted further downwardly to be held at a position Z at which the tip of the filter 8 is brought into contact with the rearward end of the support frame 21 of the reflecting mirror 2. By doing so, the light rays reflected ing surface of said reflecting mirror at an acute angle thereto and directed toward the eyes of the driver of the automobile, said eye-piece mirror further having a cylindrical extension along one side thereof;

6. said stay bar has therein a socket with flexible sidewalls at a position close to said reflecting mirror for receiving said cylindrical extension of said eyepiece mirror;

7. a bolt passing through said extension of said eye-piece mirror and said sidewalls, whereby tightening the bolt will urge the sidewalls toward each other to hold the cylindrical extension therebetween;

8. transparent panel means on the rearward opening of said hollow housing for sealing this opening from the outside;

9. filter means slightly larger than said reflecting mirror for filtering the intensity of light reflected by said mirrors; and 10. support means located above the windshield and close to said aperture for adjustably supporting said filter means, whereby:

said filter means can be adjustably positioned substantially parallel to the pathway between said objective mirror and said reflective mirror outside of the path of said light rays reflected from said objective mirror to said reflecting mirror, and further said filter means can be adjustably positioned substantially parallel to the light rays reflected from said eye-piece mirror to the eye position of the driver between said objective mirror and said reflecting mirror, thereby filtering only those light rays traversing the path between said objective and reflecting mirror, and still further said filter means being slightly larger than said reflective mirror can be adjustably positioned against the edge of said reflecting mirror across the path of light rays travelling from said eye-piece mirror to the eye position of the driver and across the path traversed by the light rays reflected from said objective mirror to said reflecting mirror, thereby filtering the light rays once between said objective mirror and said reflecting mirror, and once between said eye-piece mirror and the eye position of the driver.

2. A periscope-type rear view mirror apparatus for an automobile having a roof with an aperture therein in front of the driver's position comprising:

1. a hollow housing fixed to the roof of said automobile above said aperture having an inclined wall inclining at an angle substantially equal to the angle of inclination of the front windshield, having two side walls extending from the opposite side edges of said inclined wall toward the roof of the automobile, and further having a rearward opening opposing said inclined wall and defined by said inclined wall, said side walls, and the roof of said automobile;

2. a planar objective mirror fixed to said inclined wall above the aperture and positioned within the housing opposite the rearward opening;

3. adjustable stay means secured at one end thereof to the inner surface of the automobile body at a position above and near the windshield and extending downward therefrom, said stay means comprised of:

a. a stay bar having a cylindrically shaped fulcrum member at one end thereof transverse to the length of said bar;

b. a mounting bracket attached to the inner surface of the automobile body above and near the windshield having a groove therein for receiving the fulcrum member of said stay bar;

c. a cover plate having a groove therein corresponding to the groove in said mounting bracket, whereby the fulcrum member of said stay bar can fit into the bore formed by the grooves between said mounting bracket and said cover plate; and d. screws for holding said cover plate over said mounting bracket with said fulcrum member therebetween, whereby adjusting the tightness of the screws will adjust the positioning of said stay bar;

4. a planar reflecting mirror substantially horizontally fixed on the free end of said stay means, below said aperture, so that the reflecting surface of the reflecting mirror faces upwardly toward the aperture in the roof of the automobile and said objective mirror;

5. a planar eye-piece mirror pivotally secured to said stay means adjacent to said reflecting mirror and having its reflecting surface opposed to the reflecting surface of said reflecting mirror at an acute angle thereto and directed toward the eyes of the driver of the automobile, said eye-piece mirror further having a cylindrical extension along one side thereof;

6. said stay bar has therein a socket with flexible sidewalls at a position close to said reflecting mirror for receiving said cylindrical extension of said eye-piece mirror;

7. a bolt for passing through said extension of said eye-piece mirror and said sidewalls, whereby tightening the bolt will urge the sidewalls toward each other to hold the cylindrical extension therebetween;

8. transparent panel means on the rearward opening of said hollow housing for sealing this opening from the outside;

9. filter means slightly larger than said reflecting mirror for filtering the intensity of light reflected by said mirrors; and 10. support means located at the free end of said stay means adjacent said reflecting mirror for adjustably supporting said filter means, whereby said filter means can be adjustably positioned beneath said reflecting mirror fixed to said stay means outside of the pathways of any of the light rays reflected by any of the mirrors, and further said filter means can be adjustably positioned substantially parallel to said eye-piece mirror in front of the light path between said objective and reflecting mirrors, thereby filtering only those light rays traversing the path between the eye-piece mirror and the eye-position of the driver, and still further said filter means being slightly larger than said reflecting mirror can be adjustably positioned across the light path between said objective mirror and said reflecting mirror while at the same time being positioned across the light path between said eye-piece mirror and the eye position of said driver, thereby filtering the light rays once between the objective mirror and the reflecting mirror and once between the eye-piece mirror and the eye position of the driver.

* * * * *